(12) United States Patent
Shakespeare et al.

(10) Patent No.: US 8,049,364 B2
(45) Date of Patent: Nov. 1, 2011

(54) BACK-UP POWER SYSTEM

(75) Inventors: Walter Jeffrey Shakespeare, Macungie, PA (US); Clarence William Crompton, Macungie, PA (US)

(73) Assignee: Electrikus, Inc., Bethlehem, PA (US)

( * ) Notice: Subject to any disclaimer, the term of this patent is extended or adjusted under 35 U.S.C. 154(b) by 0 days.

(21) Appl. No.: 12/133,048

(22) Filed: Jun. 4, 2008

(65) Prior Publication Data

US 2008/0296975 A1 Dec. 4, 2008

Related U.S. Application Data

(60) Provisional application No. 60/941,744, filed on Jun. 4, 2007.

(51) Int. Cl.
*H02J 9/00* (2006.01)
(52) U.S. Cl. ........................................... 307/64
(58) Field of Classification Search .................... 307/64, 307/65
See application file for complete search history.

(56) References Cited

U.S. PATENT DOCUMENTS

| | | | | |
|---|---|---|---|---|
| 5,625,237 A | * | 4/1997 | Saeki et al. | 307/48 |
| 5,973,367 A | * | 10/1999 | Williams | 257/365 |
| 6,201,319 B1 | * | 3/2001 | Simonelli et al. | 307/26 |
| 6,201,371 B1 | * | 3/2001 | Kawabe et al. | 320/121 |
| 6,693,371 B2 | * | 2/2004 | Ziegler et al. | 307/64 |
| 7,049,711 B2 | * | 5/2006 | Kanouda et al. | 307/66 |
| 7,071,580 B2 | * | 7/2006 | Hori | 307/23 |
| 7,218,056 B1 | * | 5/2007 | Harwood | 315/86 |
| 7,417,410 B2 | * | 8/2008 | Clark et al. | 323/223 |
| 7,432,617 B2 | * | 10/2008 | Kanouda et al. | 307/66 |
| 7,514,815 B2 | * | 4/2009 | Paik et al. | 307/64 |
| 7,550,873 B2 | * | 6/2009 | Jiang et al. | 307/64 |
| 7,771,087 B2 | * | 8/2010 | Wilcox et al. | 362/294 |
| 2008/0067872 A1 | * | 3/2008 | Moth | 307/66 |

\* cited by examiner

*Primary Examiner* — Michael Rutland Wallis
(74) *Attorney, Agent, or Firm* — Design IP

(57) ABSTRACT

A substantially uninterruptible backup power system to provide power to common household appliances comprises a rechargeable battery, a trickle-charging circuit to keep the battery fully charged at all times from the receptacle power, a DC to AC inverter to supply standard AC line voltage from the battery to the lamp, a relay switch, controlled by main power voltage, to switch to the backup system when main power fails, and a timing circuit to optimize a voltage output of the system based on current battery voltage and a desired time period for the voltage output. The system can be set to operate only when the appliance is turned on, which optimizes the current and power required to provide backup power to the appliance for a maximum period of time.

34 Claims, 12 Drawing Sheets

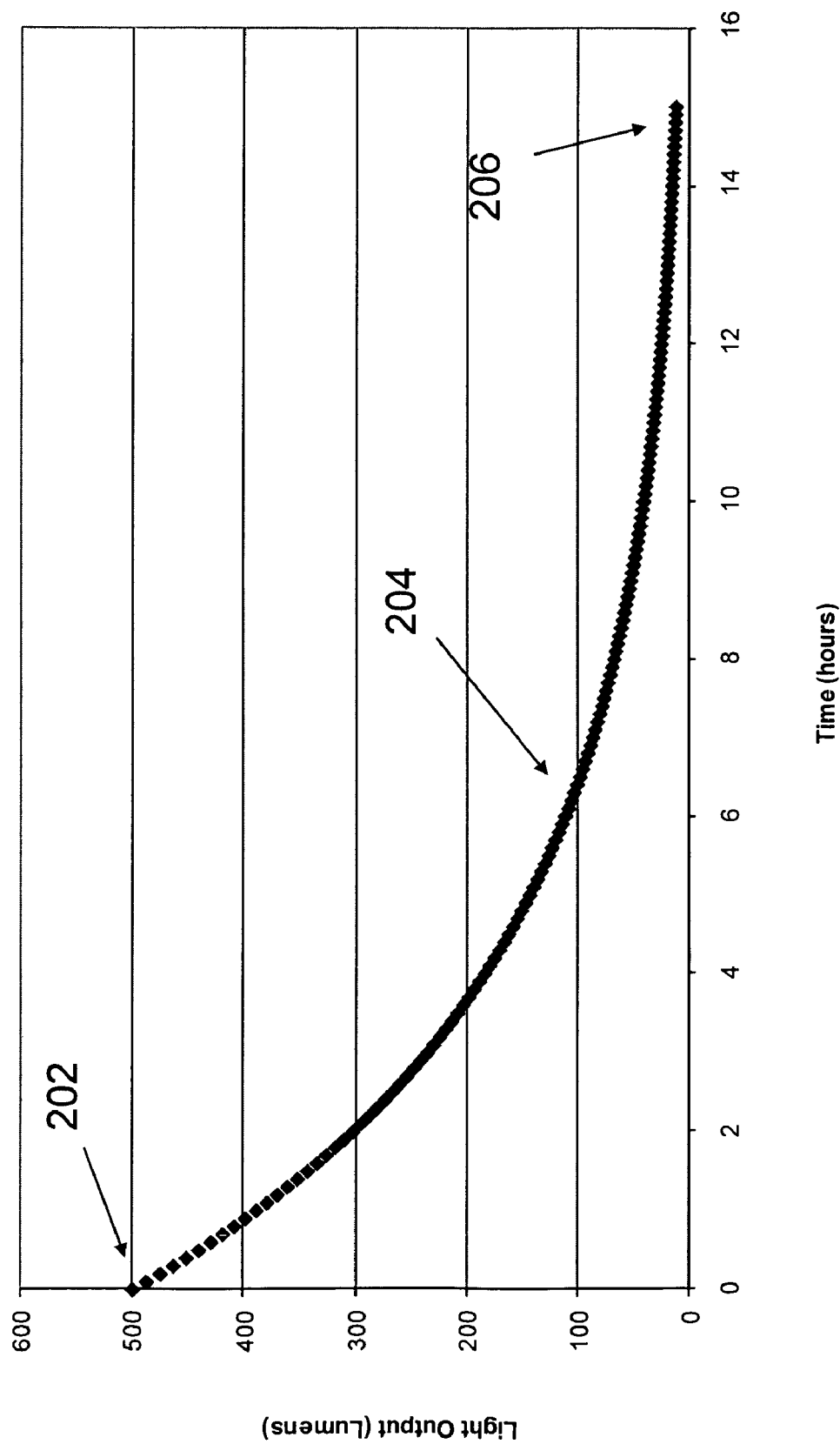

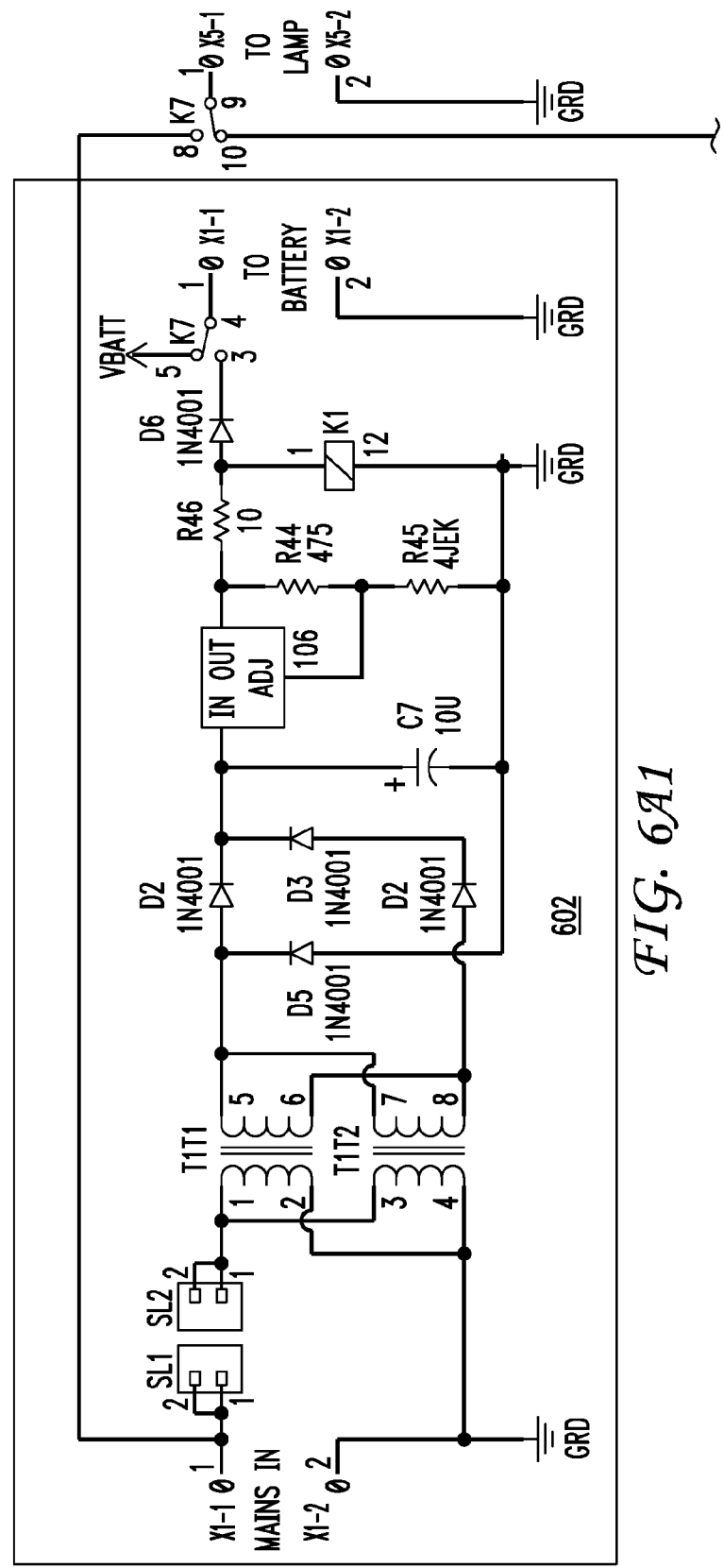
FIG. 6A1

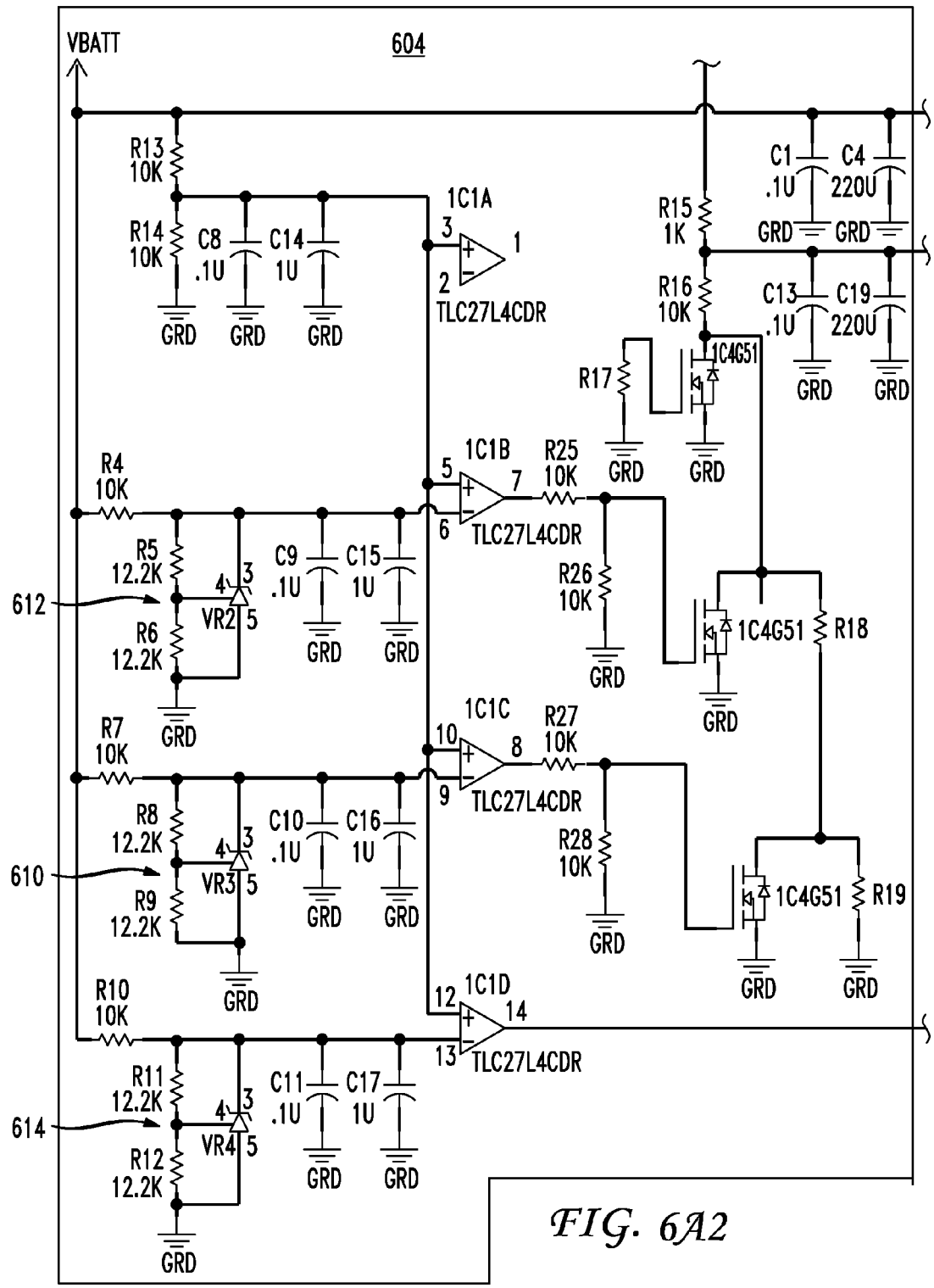
FIG. 6A2

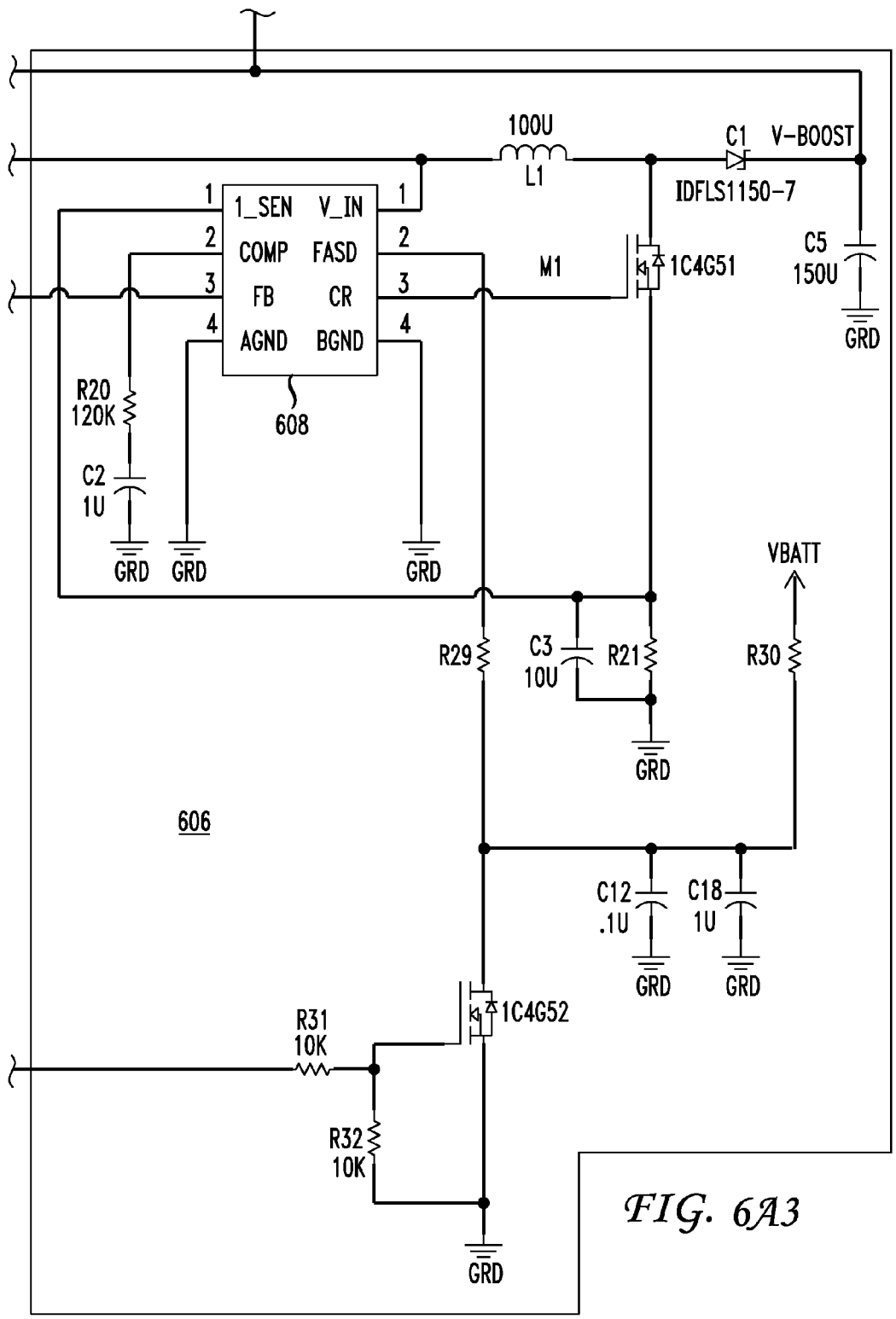
FIG. 6A3

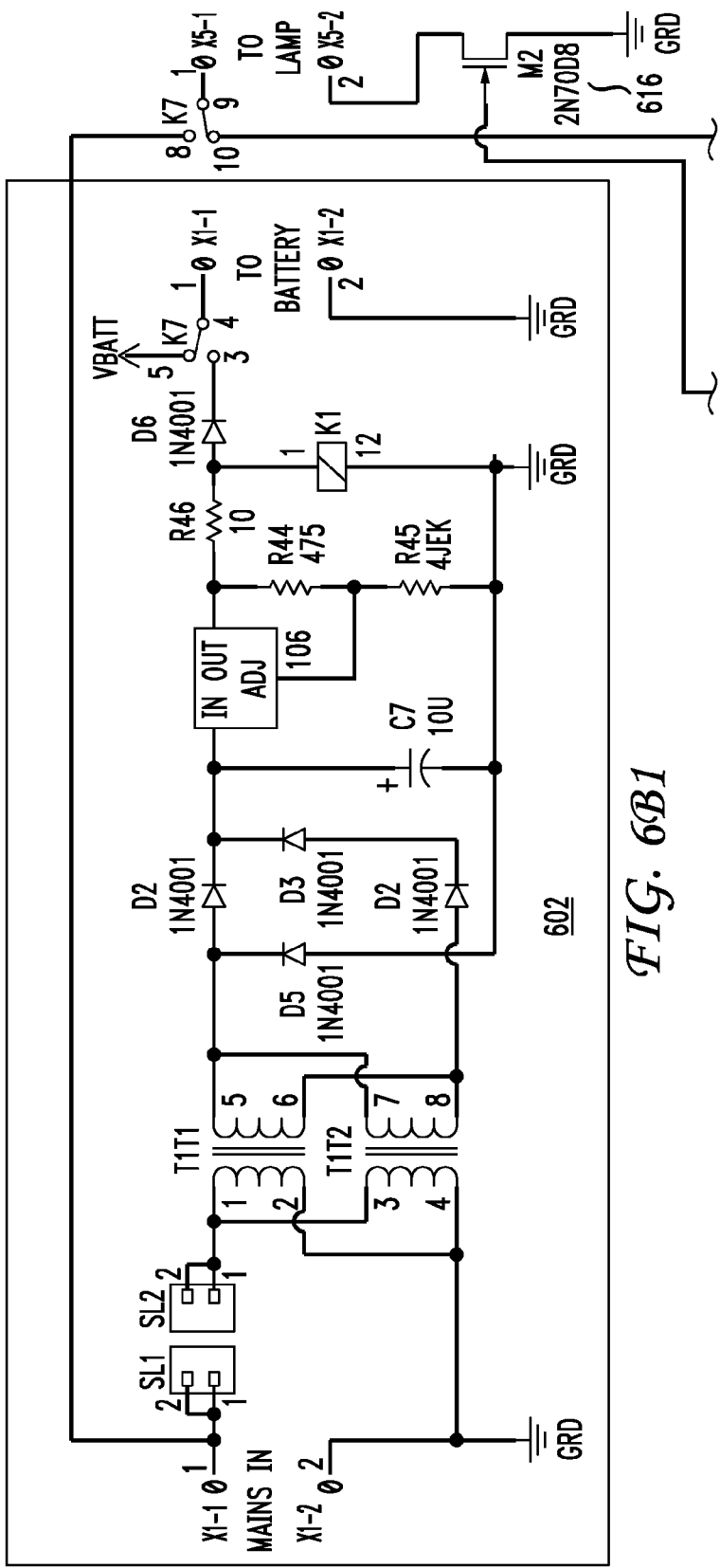
FIG. 6B1

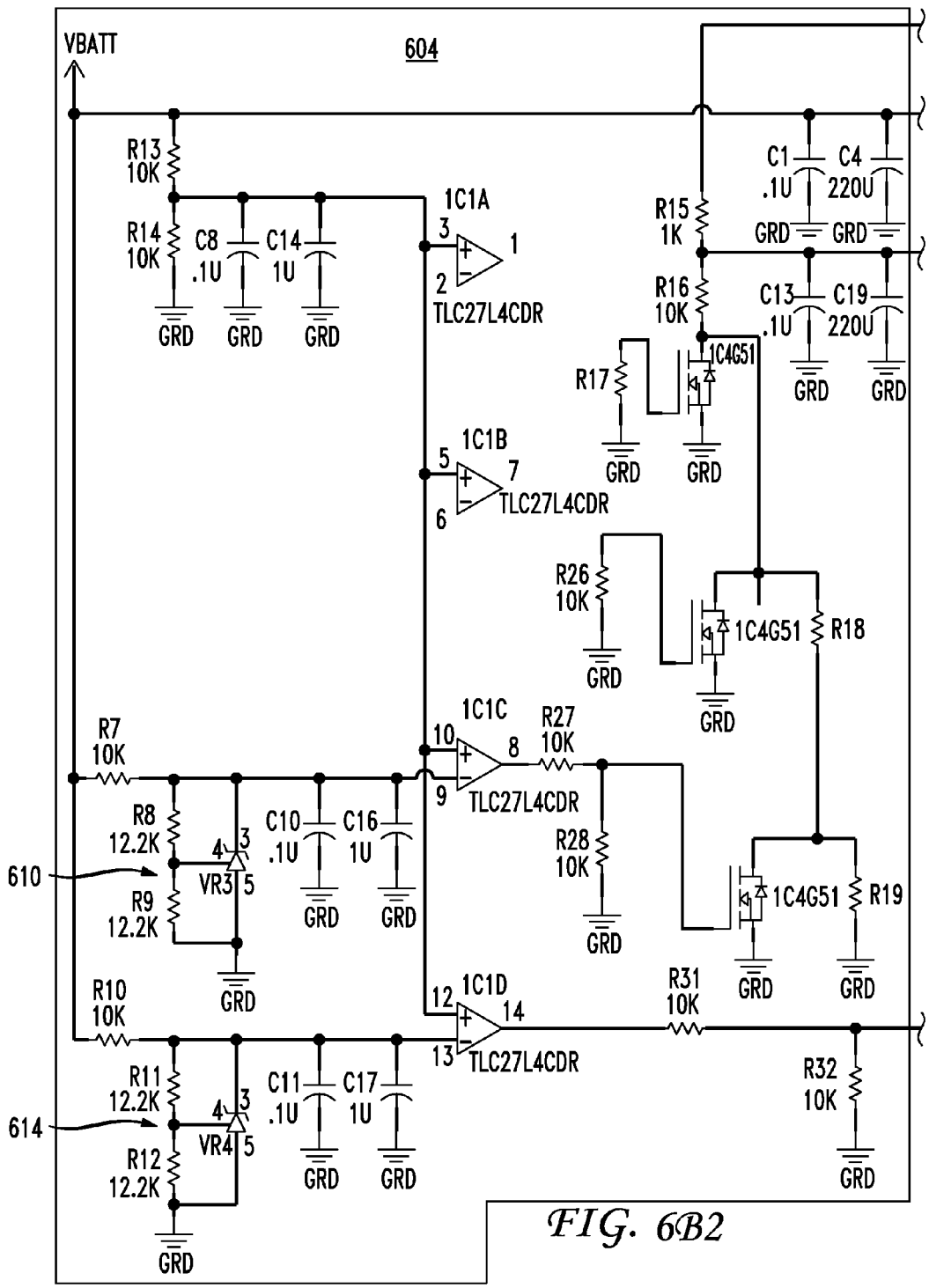
FIG. 6B2

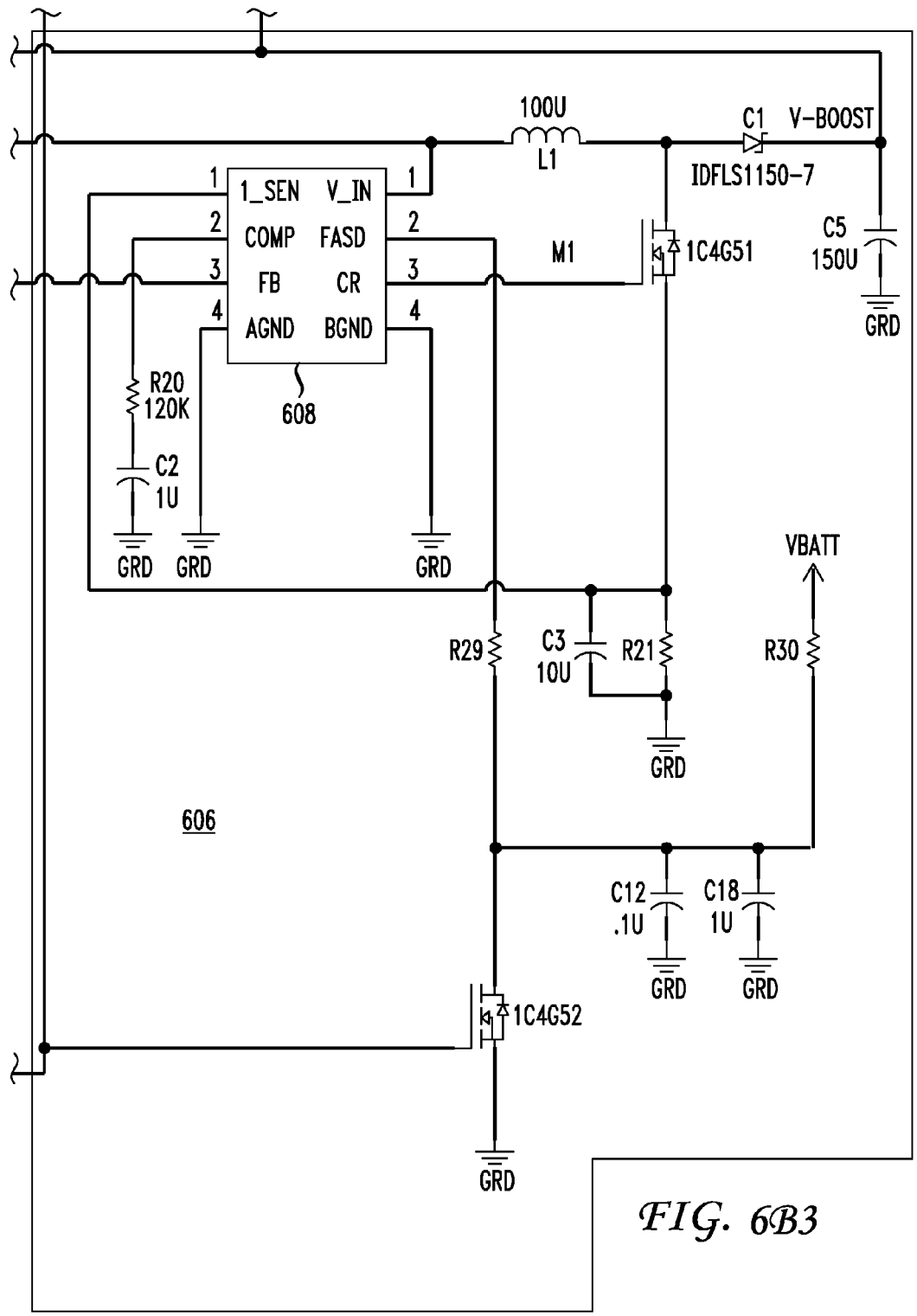
FIG. 6B3

BACK-UP POWER SYSTEM

CLAIM TO PRIORITY

This application claims the benefit of our co-pending U.S. Provisional application entitled "EMERGENCY BACK-UP POWER SYSTEM," which was filed on Jun. 4, 2007 and was assigned Ser. No. 60/941,744, which is incorporated by reference herein.

BACKGROUND

1. Field of the Invention

Embodiments of the present invention generally relate to back-up power systems, and, in particular, to a system for providing back-up battery operated power to an appliance in the event of a power failure.

2. Description of the Related Art

Power outages during times of floods, high wind, wildfires, ice and snow storms, and other natural disasters are relatively common even in the U.S. When power fails, one of the most disturbing consequences is being left in the dark, especially for the elderly or families with small children. To overcome this problem, multiple systems have been developed in the general area of uninterruptible power sources, emergency lighting, and home safety. However, there is still a need to have practical, reliable, cost effective back-up power in the event of an emergency.

Emergency lighting systems for commercial buildings have been continuously improved for many decades and fall into several broad categories of approach to the problem. Systems making use of low voltage alternative light sources, such as, for example, a light emitting diode (LED) that can be battery powered and separately controlled when main lighting fails have been in use in commercial establishments. Another system uses the main lights and a battery backup power system connected in parallel with the main power source. When power fails, a circuit senses the loss of power and switches to the backup unit. However, such systems are designed primarily for commercial application, either directly built into the lighting fixture, a light bulb, or into the control switch and automatically sense loss of power so that there is always some light to evacuate the building. They are complicated, expensive and may require rewiring the building. These are not well suited for the home.

Systems designed for home use include battery back-up night light systems that may be built into the wall switch or into a plug-in night light and become active when a power failure occurs. However, light output is very low corresponding to a night light or a single candle. Manually rechargeable flashlights that do not require batteries are another solution to the problem. In this case there is considerable physical exertion just to maintain enough light to see. This is fine for emergency evacuation but not for waiting in a kitchen or family room until power returns. Another approach is to build a backup battery system into the lamp itself or into the bulb. These devices may require a second switch in addition to the lamp switch to allow turning off the lamp without disabling the emergency lighting feature. Yet another approach is to build a decorative luminary. The problem with these systems is twofold. First, the consumer does not have the freedom to choose the lamp to match interior decor, and even if the backup unit is built into the bulb, the system typically is bulky, the consumer cannot choose the type or light output of the bulb, or a shade may not fit on many lamp systems. Further, due to mechanical size constraints, there is a limited battery size and therefore, a limited length of backup time, typically less than an hour.

There have been significant developments in fluorescent light bulbs to replace traditional incandescent light bulbs for ordinary table and household lamps. The fluorescent bulbs typically are designed for a seven year life, typically provide a variety of light outputs, and have internal phosphors that are warm in color emulating the traditional incandescent lamp. Fluorescent bulbs use approximately 20% of the power commonly used by comparable incandescent lamps. In addition, fluorescent bulbs may be considered "green" or environmentally friendly since they reduce the overall emission of greenhouse gasses, making such bulbs popular in consumer household lighting.

Attempts to put a standard fluorescent bulb into an adaptor for a table lamp and then use a battery backup circuit as a ballast to supply the high voltage and low current needed to operate the fluorescent light also have been developed. The advantage of the fluorescent light is that the power required for a given lumen output is very low and therefore the light will stay on for a relatively long time. However, drawbacks include large, bulky bulbs that may not fit many household appliances, as well as harsh fluorescent light. Finally, there are standby emergency generators that can be directly wired into the main power of a dwelling or building, but these are expensive. Additionally, because the generator power is provided to the entire home without selectivity as to what appliance is powered, the length of time for back-up is generally only two to three days with a single charge of fuel.

Thus, there exists a need for an inexpensive and easily portable back-up power system that is always ready in case of power failure, stays on automatically, may be used selectively for different lighting sources, and provides multiple output levels of power.

SUMMARY

An embodiment of the present invention depicts a backup power system specifically designed to provide substantially uninterruptible power to household appliances during a main power failure. The system comprises a rechargeable battery, a charging circuit, such as a trickle-charging circuit, which manages delivery of voltage to an appliance during a main power outage, a DC to AC inverter to supply standard AC line voltage from the battery to the appliance, a relay switch controlled by a main power source to switch to the backup battery when a power failure occurs, and a timing circuit to optimize the life of the rechargeable battery with the power supplied by the system. The system can be a stand-alone system encased within a durable housing that is external to an appliance to which power is to be supplied. The system can be placed near the intended appliance, for example, if intended to supply power to a table or floor lamp, the system can be placed near the lamp on a floor behind a table or couch, similar to a laptop power supply unit. A typical house appliance, such as, for example, a house lamp, is connected into a first end of the system, and a second end of the system then connects to a main power source, such as a common wall outlet. The wall outlet provides power to charge the battery while main power is provided to the house lamp. When a main power failure occurs, the system provides a current-limited voltage value equivalent to the full wattage output of the bulb currently placed in the lamp for a period of time. The system operates only when the appliance is set to be on, for example, if the lamp is turned off, the backup system stops providing backup power until the lamp is turned on at a later time.

Embodiments of the present invention include a system comprising a rechargeable battery including, but not limited to, a sealed lead acid battery, a nickel metal hydride battery, a lithium ion battery, and the like. In an embodiment of the present invention, a switch limits output current to one of a plurality of settings to provide for the maximum flexibility in backup power time vs. power output. In another embodiment, the plurality of settings include a first setting to provide a full power voltage to a chosen appliance, a second setting to provide a medium power voltage to the appliance, and a third setting to provide a low power voltage to the appliance, in order to extend the power supplied to the appliance during a main power failure. For example, in using a system of an embodiment with a house lamp, the first setting may produce a power output equivalent to a 60 Watt ("W") incandescent bulb. The second setting limits the power output to a 25 W equivalent incandescent bulb, and the third setting, in cases where there is an extended main power failure, may provide the light level of a couple of candles or a night light.

In one embodiment of the present invention, a backup power system comprises a manual switch that is external to a casing of the system, thereby allowing a user to change the power settings based on the extent of the main power failure. In yet another embodiment of the present invention, a system comprises a switch that is internal to the casing and is preset to change power settings at specific periods of time, based upon the selected appliance.

Another embodiment of the present invention provides a backup power system comprising a trickle-charging circuit that reduces current supplied to the appliance in an arbitrary profile over a period of time in order to maximize the battery life during a main power failure period. For example, a system connected to a house lamp may comprise a trickle-charging circuit that gradually reduces the power output to an appliance, such as a table lamp, from approximately a full power output of a typical lamp bulb, whether incandescent or fluorescent, to about a power output of a single candle, according to the voltage and amount of battery power remaining in the system. The trickle circuit interacts with the timing circuit of the system to balance the life of the battery with delivering power for an optimal amount of time to the appliance in order to produce an optimized power output.

In yet another embodiment of the present invention, a backup power system comprises a system using a DC to DC converter instead of a DC to AC converter. The use of the DC to DC converter is an optimum choice when supplying backup power to an appliance using fluorescent light.

BRIEF DESCRIPTION OF THE DRAWINGS

So the manner in which the above recited features of the present invention can be understood in detail, a more particular description of embodiments of the present invention, briefly summarized above, may be had by reference to embodiments of which are illustrated in the appended drawings. It is to be noted, however, the appended drawings illustrate only typical embodiments encompassed within the scope of the present invention, and, therefore, are not to be considered limiting, for the present invention may admit to other equally effective embodiments.

FIG. 2 is a graphical illustration of power provided by the first system of FIG. 1, in accordance with an embodiment of the present invention;

FIG. 6A, comprising 6A1-6A3, illustrates an example of circuitry underlying a backup power system, in accordance with an embodiment of the present invention; and FIG. 6B, comprising 6B1-6B3, illustrates a modified example of the circuitry shown in FIG. 6A, in accordance with an embodiment of the present invention.

DETAILED DESCRIPTION

Figure 1A:
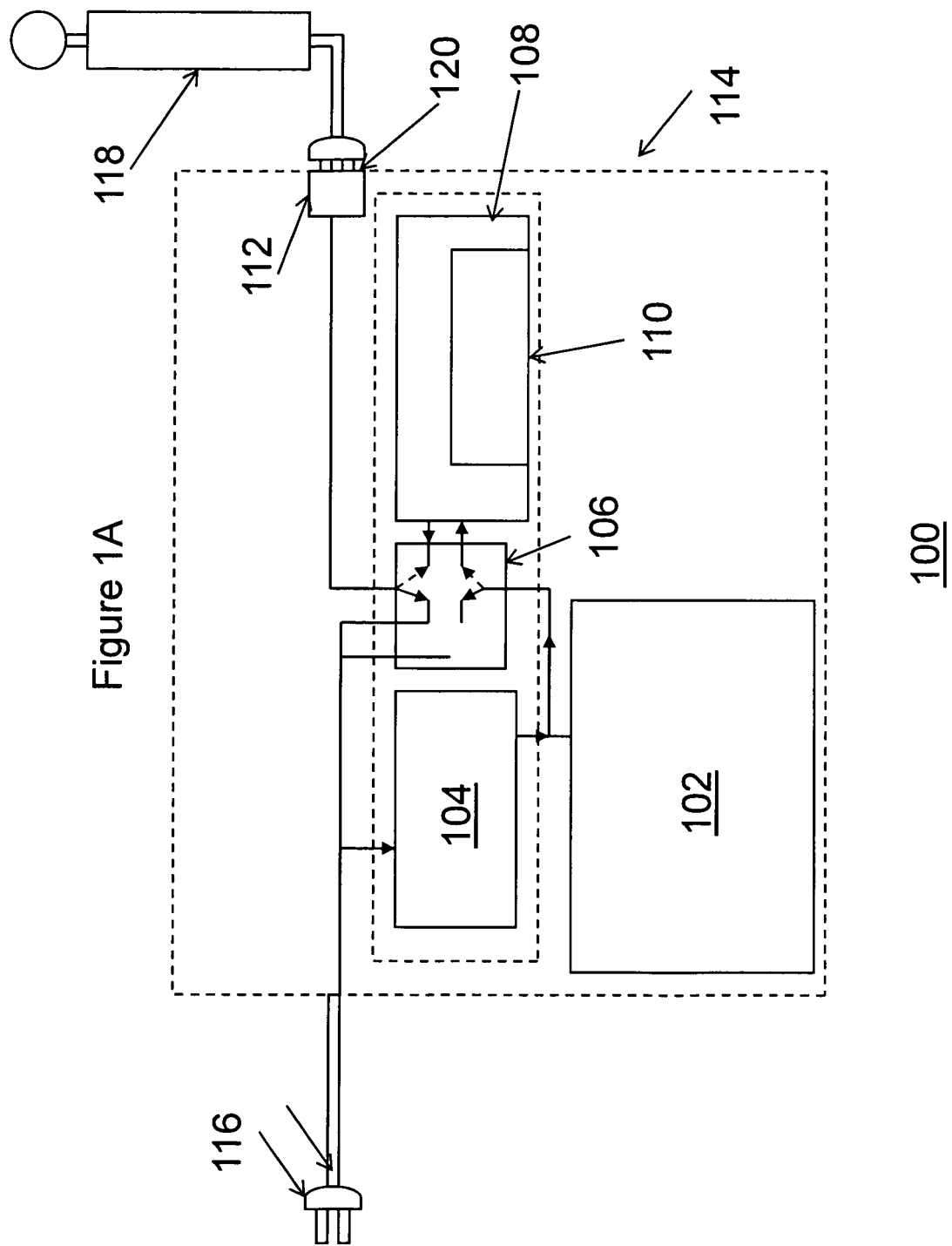
FIG. 1A shows a first backup power system, in accordance with an embodiment of the present invention.

A system 100 of FIG. 1A comprises a rechargeable battery 102, a charging circuit 104, preferably a trickle-charging circuit, a relay 106, a DC to AC inverter 108, and a timing circuit 110 to optimize a voltage output of the system based on current battery voltage and a desired time period for the voltage output. The system 100 can further comprise an AC receptacle 112 to provide a connection to an appliance to be powered. The system 100 is encased inside a durable housing 114 and can further include a connection means 116, such as an AC cord and plug, to provide a connection to a main power source.

The rechargeable battery 102 can be a sealed lead acid battery, a nickel metal hydride battery, a lithium ion battery, or any battery capable of being recharged. The battery 102 can be continuously fully charged by a trickle-charging circuit 104, which also can recharge the battery 102 within a specific time period, such as, for example, 12 to 24 hours, by connecting the system 100 to a main power outlet.

The relay 106 connects to a main power source by connecting the AC cord and plug 116 into a main power outlet. The relay 106 remains connected to the AC receptacle 112 and a selected appliance, such as a lamp 118, via a socket 120 located on the housing 114 and connected to the AC receptacle 112, so long as main power is available. In the event of power failure, the relay 106 disconnects the main power from the AC receptacle 112, connects the battery 102 to the input of the DC to AC inverter 108, and connects the output of the inverter 108 to the AC receptacle 112 to power the lamp 118. Another embodiment of the present invention depicts a system comprising a suitable electrical circuit to act as a relay such as, for example, a triac or high speed mosfet with an optoisolator.

Figure 1B:
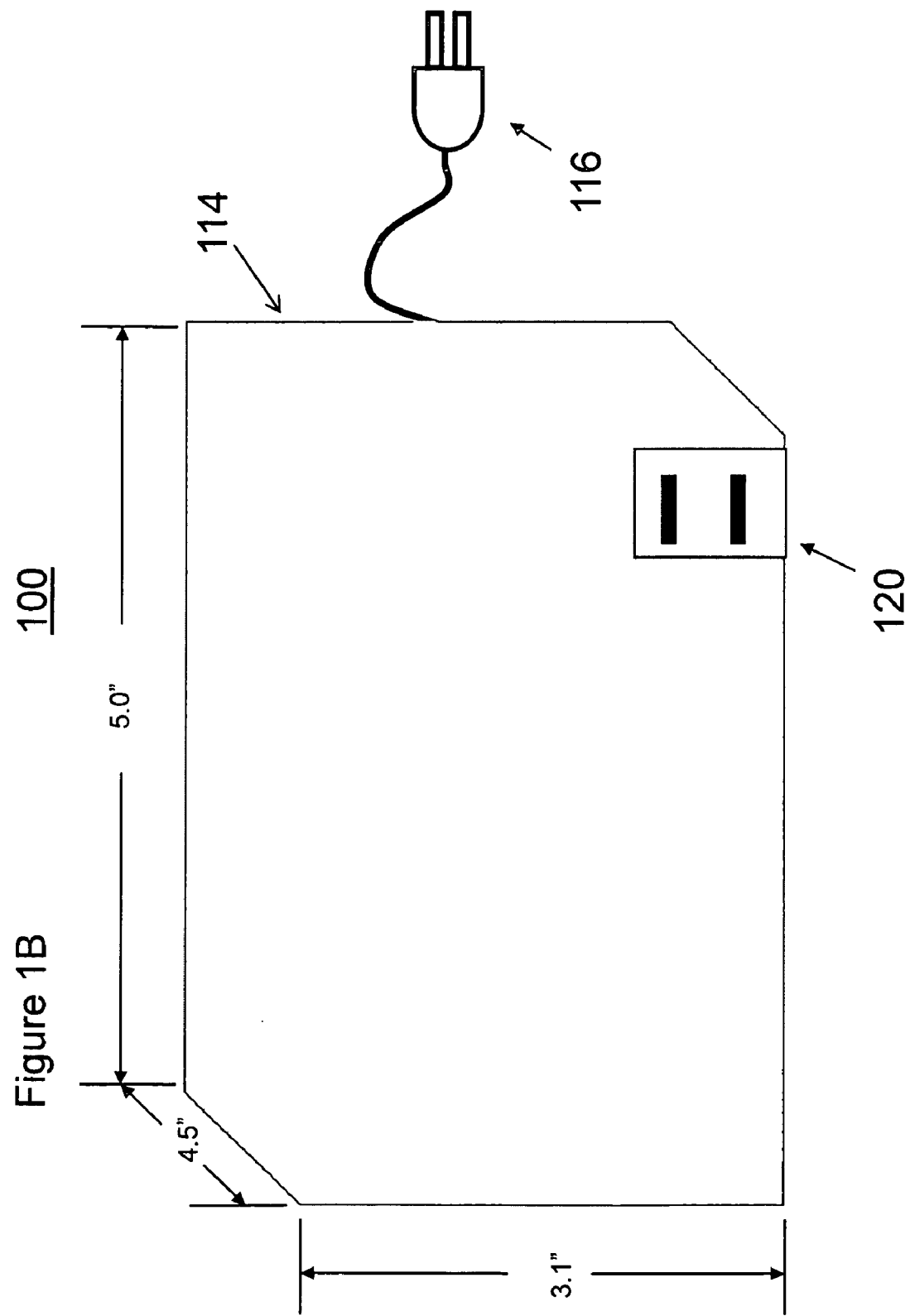
FIG. 1B shows a structural depiction of the first system of FIG. 1, in accordance with an embodiment of the present invention.

As shown in FIG. 1B, the housing 114 of system 100 may be made of a durable material, such as a composite plastic capable of securely enclosing the components of system 100 while able to withstand any heat produced by the battery 102. The dimensions shown in FIG. 1B are provided as an example and are not meant to limit embodiments of the present invention in any manner. Based on the size and wattage of the rechargeable battery 102 and by controlling and optimizing the current supplied, the system 100 provides a substantially uninterruptible power source for wide range of battery life/light level combinations and, thus, a wide range of appliances.

Another embodiment of the present invention presents a system, similar to system 100 of FIG. 1A and FIG. 1B, that may be applied to a refrigerator. A refrigerator typically uses a large amount of energy under normal conditions, and this amount may be more than what may be provided from a battery. During a power outage, there is no need to maintain food at the normal operating temperature, but only a need to maintain an intermediate temperature that will allow the food to not spoil. Thus, a system similar to system 100 can override the thermostat of the refrigerator to provide power to maintain this intermediate temperature. Further, there may not be a need for the refrigerator backup power system to provide continuous power since temperature changes slowly over a period of time. Thus, the backup power system can be designed to provide short bursts of power necessary to maintain the intermediate temperature of the refrigerator.

Accordingly, most users desire to keep the temperature of the freezer compartment of a refrigerator just below freezing, which requires far less energy than under normal operation. Similar to system 100, the refrigerator backup system can override the freezer thermostat to provide power, perhaps at small intervals of time, to compensate for the conductive warming of the freezer compartment. The refrigerator backup system maintains food frozen for a longer period of time compared to allowing the refrigerator to operate normally during the outage.

In yet another embodiment, a system similar to system 100 of FIGS. 1A and 1B may be provided to use with a sump pump. The backup power system may be timed to operate at specified time intervals rather than whenever the water level detection calls for pumping. Therefore, the system is tailored to a specific application and may optimize the power supplied for a longer period of time compared to allowing the sump pump to continuously run.

The trickle-charging circuit 104 coupled with the timing circuit 110 are used to reduce the current supplied by the system 100 in a controlled manner, over a period of time, to maximize the battery life during a power outage. Reduction of current output is controlled using a series of voltage gates coupled with a voltage divider circuit that is set to one or more step downs in the output voltage level of the system 100. The gate levels are based on the voltage level of the rechargeable battery 102 and operate to optimize the balance of life of the rechargeable battery 102 with the voltage output to the intended appliance.

For example, the system 100, which incorporates a rechargeable battery 102 such as a sealed lead acid battery, is capable of outputting 120V of AC power. When a main power failure occurs, the relay 106 activates to switch power to a connected appliance from the main power source to the backup power system. In this instance, a first voltage gate is set to approximately 12V in order to deliver approximately 120V of AC power to the appliance until the rechargeable battery voltage falls to a certain level. Providing full power immediately allows for a user to experience substantially no power interruption when the main power outage occurs. In this example, the system 100 supplies approximately 120V of AC power for about one to about two hours.

Once the voltage of the battery 102 reaches a predetermined level, a second voltage gate activates to lower the voltage output to a medium level for an optimum amount of time, while maintaining a balance between the life of the battery and power output. For example, the second voltage gate is set to 11.5V to deliver approximately 60V of AC power to the connected appliance. The system 100 then sustains this voltage level for about three to about four hours.

A third voltage gate can be implemented to lower the power output to a lower level in order to extend battery life. For example, a voltage gate set to approximately 11V activates when the battery voltage reaches this level. Once the third gate is active, the system will provide approximately 30V of AC power for about four hours until a shutoff battery voltage level is reached, for example 10V. Another aspect of this embodiment includes a low voltage shutoff circuit that terminates the power output of the system 100, thereby removing any risk of damaging the battery 102 due to over discharge.

In yet another embodiment of the present invention, a system can comprise one or more voltage gates that are preset to allow for the system to initially deliver approximately a full voltage output to a connected appliance, such as a lamp, when the battery of the system is not charged completely. Thus, for example, when a power outage occurs, the system can output approximately full power to a connected appliance for a small period of time, such as one to two seconds, then immediately step down to a lower voltage level that comports with the current voltage level of the battery of the system. This facilitates turning on the appliance.

FIG. 2 illustrates power output and dissipation associated with the system 100, according to an embodiment of the present invention. Initially, system 100 provides a full power output to the lamp 118, as shown at 202, once the main power supply fails. Over a period of time, the system 100 allows the power to decay at a controlled optimum rate. At point 204, the power level of the lamp is reduced to a middle level based upon the original full wattage of the battery 102 and of the lamp 118. The system 100 continues to allow the power output to decay to a lowest level 206, reached at a time of about 15 hours. For example, if a main power failure occurred in the morning, the system 100 would provide power to the lamp 118 throughout the day until dusk or nightfall. Since most power outages are corrected within several hours, a user would be able to have plenty of lamp light during this time. In an alternate embodiment, a user may delay the operation of the system 100 until such power is needed. For example, if a power outage occurred during a day where sunlight is provided, or light is not needed immediately, the user may opt to delay the operation of the system 100 until light is needed at a later time, for example, at dusk, if the power outage continues. Thus, the system 100 will not deliver power to the lamp until the user turns the lamp on to set the lamp in an active state.

Figure 3:
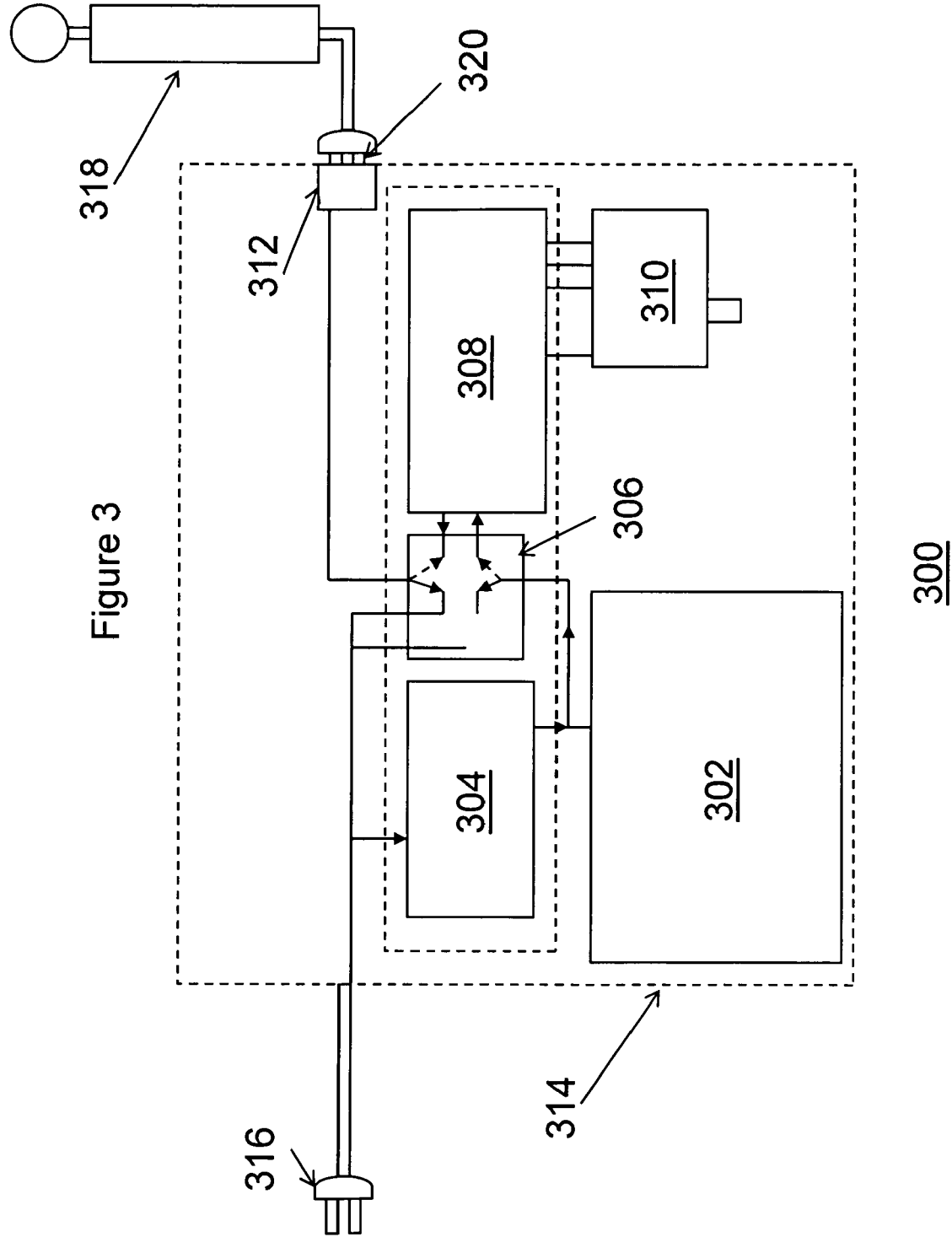
FIG. 3 presents a second backup system, in accordance with an embodiment of the present invention.

FIG. 3 presents a system 300 similar to system 100 of FIGS. 1A and 1B, wherein system 300 comprises a rechargeable battery 302, a charging circuit 304, preferably a trickle-charging circuit, a relay 306, a DC to AC inverter 308, and a switch-timing circuit 310 to optimize the current provided based upon the battery voltage and desired time period for power output. The system 300 may further comprise an AC receptacle 312 to provide a connection to an appliance to be powered, such as lamp 118, via a socket 320. The system may be encased inside a housing 314 and may further include a connection means 316, such as an AC cord and plug, to provide a connection to a main power supply. The switch-timing circuit 310 may be controlled by a manual position switch to set the power output of the system 300. The position switch allows a user to customize the use of the system 300 by setting the switch to correspond to a fixed light level and battery life combination for as long as the system 300 will provide.

Figure 4:
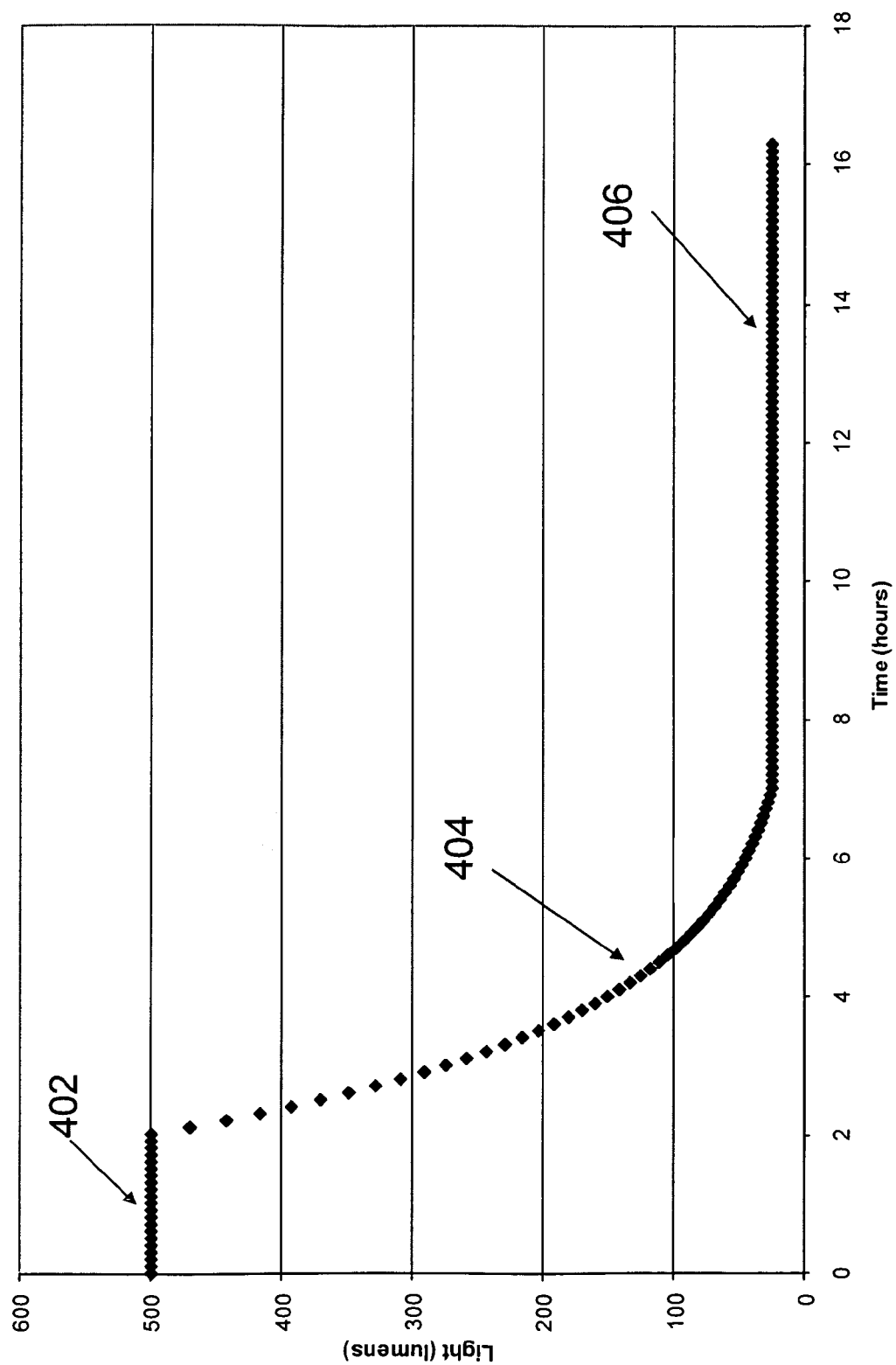
FIG. 4 is a graphical illustration of power provided by the second system of FIG. 3, in accordance with an embodiment of the present invention.

FIG. 4 illustrates power output and dissipation associated with the system 300 of FIG. 3. As shown at 402 in FIG. 4, a user may desire to use system 300 to output full lamp power for about a two-hour period. The user then may position the switch to allow the power to decay 404 over a short period of time in order for the system 300 to quickly produce the lowest level of power and light 406, based upon the needs of the user.

Figure 5:
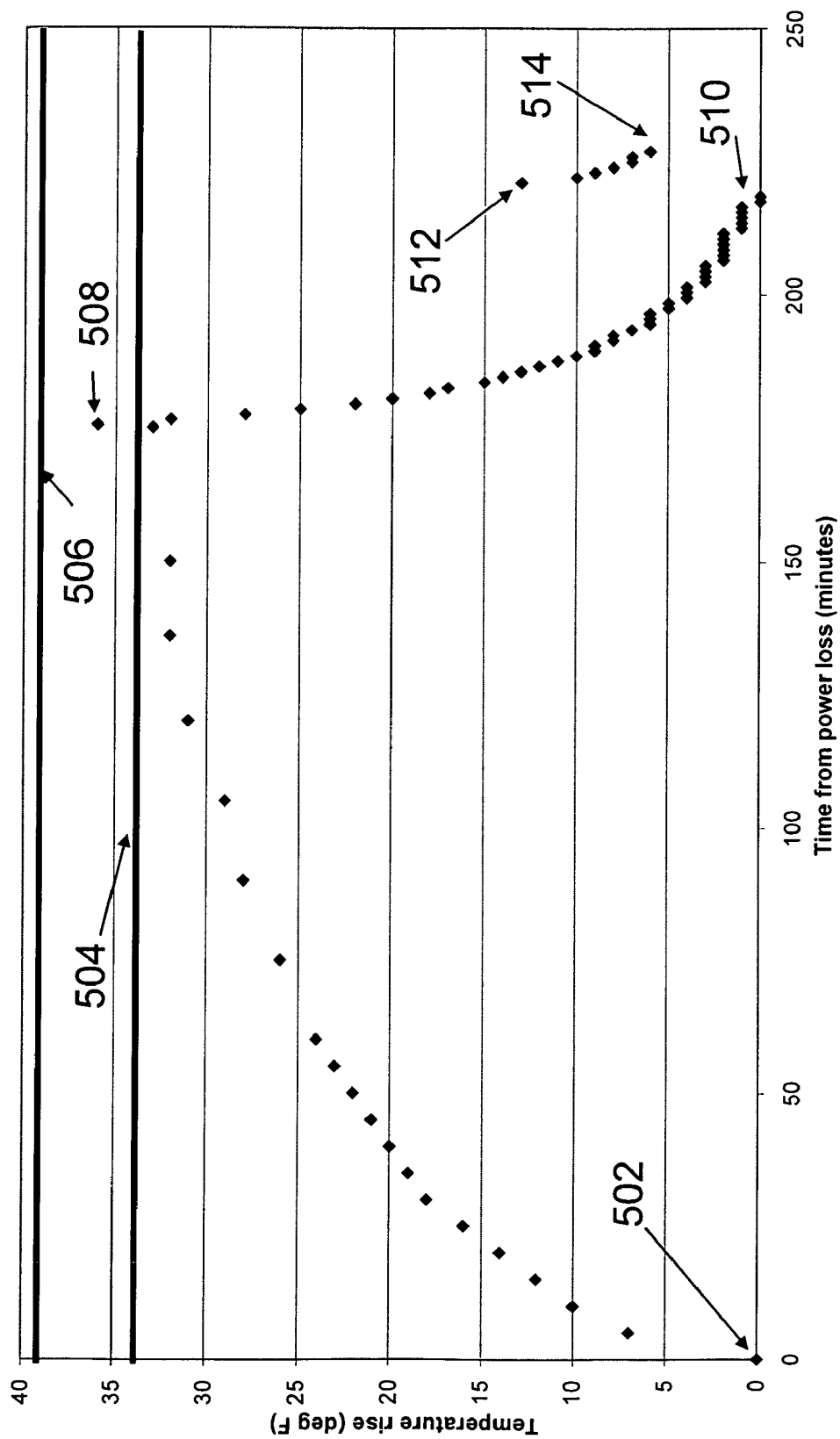
FIG. 5 is a graphical illustration of power provided by a third backup power system, in accordance with an embodiment of the present invention.

FIG. 5 provides an example of power provided by a backup power system designed to work with a household freezer. As shown at 504, when a power outage occurs, the backup system operates to provide a power output level that is above the normal temperature of the freezer, shown at 502, but maintains the freezer at a safe operating temperature 504, for example, below the melting temperature 506. At predetermined time intervals, the backup system may switch on the compressor, as shown at 508, to cool the freezer down to normal operating temperature 510. If the freezer is opened, as shown at 510, there is a warming of the freezer, as shown at 512, compensated by the next cycle of power outputted by the backup system, as shown at 514. The compressor is controlled by the backup system instead of the thermostat in the freezer. When main power is restored, the backup system switches the power to the main power supply and the freezer returns to normal operating temperature.

Another embodiment of the present invention depicts a backup power system comprising a rechargeable battery, a charging circuit, such as a trickle-charging circuit, a relay switch, and a DC to DC converter. The use of a DC to DC converter can reduce the complexity of the circuitry of the system compared to using a DC to AC inverter, since some common household appliances would receive AC power from the system and convert it to DC voltage for output. For example, using a backup power system with a DC to DC converter works well with a house lamp that uses a fluorescent light bulb. A further aspect of this embodiment can include a diode to protect against a back-biasing of the relay switch from the rechargeable battery when a main power outage occurs.

An example of circuitry underlying a backup power system is shown in FIG. 6A which comprises FIGS. 6A1, 6A2, and 6A3. In FIG. 6A, a system 600 comprises a battery charger circuit 602 for charging a rechargeable battery, as shown in detail in FIG. 6A1, a voltage reduction circuit 604 for managing the voltage output of the system 600 during operation, as shown in detail in FIG. 6A2, and a DC to DC converter circuit 606, including a DC to DC output voltage control 608, as shown in detail in FIG. 6A3. As shown in FIG. 6A2, a voltage divider circuit 610 implements a controlled dissipation of battery power to a connected appliance, while a first voltage gate 612 provides an initial step down voltage to ensure that the connected appliance turns on during a power outage, even if the rechargeable battery voltage level is not at full power. A low voltage divider circuit 614 provides for shutting off the system 600 and terminating output power to the connected appliance in order to prevent battery damage due to over discharge.

A modified example of the circuitry shown in FIG. 6A is illustrated in FIG. 6B, which comprises FIGS. 6B1, 6B2, and 6B3. In FIG. 6B, the system 600 again comprises a battery charger circuit 602 for charging a rechargeable battery, as shown in detail in FIG. 6B1, a voltage reduction circuit 604 for managing the voltage output of the system 600 during operation, as shown in detail in FIG. 6B2, and a DC to DC converter circuit 606, including a DC to DC output voltage control 608, as shown in detail in FIG. 6B3. As an alternative to the circuitry described in FIG. 6A, a low battery voltage shutoff transistor 616 can be incorporated with the low voltage divider circuit 614 to shut down the system 600, as shown in FIG. 6B1.

Although various embodiments which incorporate the teachings of the present invention have been shown and described in detail herein, those skilled in the art can readily devise many other varied embodiments that still incorporate these teachings.

We claim:

1. A backup power system for providing substantially uninterruptible backup power to an appliance during a main power failure comprising:
   a first electrical connector and a second electrical connector;
   a relay that electrically couples the first electrical connector to the second electrical connector when electrical power is applied to the first connector;
   a charging circuit electrically coupled to the first electrical connector;
   a rechargeable battery electrically coupled to the charging circuit;
   a current converter;
   a voltage circuit configured to provide a full voltage to the second electrical connector until the voltage level of the battery reaches a predetermined level, wherein the voltage circuit is configured to provide less than full voltage to the second electrical connector; and
   a switch-timing circuit operatively coupled to the current converter such that the switch-timing circuit is positionable to override the voltage circuit and provide full voltage output regardless of the voltage level of the battery;
   wherein the relay electrically decouples the first electrical connector from the second electrical connector and electrically couples the current converter to the second electrical connector and to the battery when electrical power is removed from the first electrical connector.

2. The backup power system recited in claim 1 further comprising a timing circuit, the timing circuit comprising a plurality of voltage gates and being configured to program the plurality of gates such that both battery backup time and performance of the appliance are maximized.

3. The backup power system recited in claim 2 wherein a first voltage gate is set to a first voltage level approximate to a full voltage output available from the rechargeable battery.

4. The backup power system recited in claim 2 wherein a second voltage gate is set to a second voltage level approximate to a medium voltage output available from the rechargeable battery.

5. The backup power system recited in claim 2 wherein a third voltage gate is set to a third voltage level approximate to a low voltage output available from the rechargeable battery.

6. The backup power system recited in claim 1 wherein the system delivers a power output approximate to a full voltage level when a battery charge level is less than the full voltage.

7. The backup power system according to claim 1, further comprising a timing circuit operatively coupled to the current converter such that the timing circuit allows voltage to the second electrical connector to decay at a controlled rate.

8. The backup power system according to claim 1, further comprising a timing circuit operatively coupled to the current converter to maintain full power output to the second electrical connector for a predetermined period of time.

9. The backup power system according to claim 8, wherein the timing circuit is operatively coupled to the current converter to step down to a lower output voltage level after the predetermined period of time.

10. The backup power system according to claim 1, further comprising a timing circuit operatively coupled to the current converter to provide electrical power to the appliance only when the appliance is set to an active state.

11. The backup power system according to claim 1, further comprising a timing circuit operatively coupled to the current converter to provide electrical power to the appliance based on the time of day.

12. The backup power system according to claim 1, wherein the voltage circuit is operatively coupled to the current converter to control the voltage being supplied to the second electrical connector when the rechargeable battery is electrically coupled to the second electrical connector, wherein the voltage circuit is adapted to reduce output voltage levels from the current converter based on output wattage to the appliance.

13. The backup power system according to claim 12, wherein the output wattage is measured at the second electrical connector.

14. The backup power system according to claim 1, wherein the switch-timing circuit is adapted to override the voltage circuit and provide full voltage output for a period of time regardless of the voltage level of the rechargeable battery.

15. A backup power system for providing substantially uninterruptible backup power to an appliance during a main power failure comprising:
    a first electrical connector and a second electrical connector;
    a switch that supplies AC power to the second electrical connector when AC power is supplied to the first connector;
    a charging circuit electrically coupled to the first electrical connector;
    a battery electrically couplable to the charging circuit and to the switch;
    a DC to DC converter electrically couplable to the second electrical connector;
    a voltage circuit operatively coupled to the DC to DC converter to control the voltage being supplied to the second electrical connector when the battery is electrically coupled to the second electrical connector; and
    a switch-timing circuit operatively coupled to the DC to DC converter such that the switch-timing circuit is positionable to override the voltage circuit and provide full voltage output regardless of the voltage level of the battery;
    wherein the switch is adapted to electrically couple the battery to the second electrical connector through the DC to DC converter when a loss of AC power from the first electrical connector occurs, and
    wherein the voltage circuit is adapted to reduce the voltage supplied to the second electrical connector based on decreasing voltage levels of the battery.

16. The backup power system according to claim 15, wherein the voltage circuit is configured to provide a full voltage to the second electrical connector until the voltage level of the battery reaches a predetermined level, wherein the voltage circuit is configured to provide less than full voltage to the second electrical connector.

17. The backup power system according to claim 15, further comprising a timing circuit operatively coupled to the DC to DC converter such that the timing circuit allows the voltage level from the DC to DC converter to decay at a controlled rate.

18. The backup power system according to claim 15, further comprising a timing circuit operatively coupled to the DC to DC converter to maintain full power output to the second electrical connector for a predetermined period of time.

19. The backup power system according to claim 18, wherein the timing circuit is operatively coupled to the DC to DC converter to step down to a lower output voltage level after the predetermined period of time.

20. The backup power system according to claim 15, further comprising a timing circuit operatively coupled to the DC to DC converter to provide electrical power to the appliance only when the appliance is set to an active state.

21. The backup power system according to claim 15, further comprising a timing circuit operatively coupled to the DC to DC converter to provide electrical power to the appliance based on the time of day.

22. A backup power system for providing substantially uninterruptible backup power to an appliance during a main power failure comprising:
    a first electrical connector and a second electrical connector;
    a rechargeable battery;
    a charging circuit electrically coupling the first electrical connector to the rechargeable battery;
    a current converter;
    a relay that electrically couples the first electrical connector to the second electrical connector only when main power is supplied to the relay and electrically couples the current converter to the second electrical connector and the battery to the current converter only during a main power failure;
    a voltage circuit operatively coupled to the current converter to control the voltage being supplied to an appliance during a main power failure, wherein the voltage circuit is adapted to reduce output voltage levels from the current converter based on decreasing voltage levels of the battery; and
    a switch-timing circuit operatively coupled to the current converter such that the switch-timing circuit is positionable to override the voltage circuit and provide full voltage output regardless of the voltage level of the battery.

23. The backup power system according to claim 22, wherein the voltage circuit is configured to provide a full voltage to the second electrical connector until the voltage level of the battery reaches a predetermined level, wherein the voltage circuit is configured to provide less than full voltage to the second electrical connector.

24. The backup power system according to claim 22, further comprising a timing circuit operatively coupled to the current converter such that the timing circuit allows the voltage level from the current converter to decay at a controlled rate.

25. The backup power system according to claim 22, further comprising a timing circuit operatively coupled to the current converter to maintain full power output to the second electrical connector for a predetermined period of time.

26. The backup power system according to claim 25, wherein the timing circuit is operatively coupled to the current converter to step down to a lower output voltage level after the predetermined period of time.

27. The backup power system according to claim 22, further comprising a timing circuit operatively coupled to the current converter to provide electrical power to the appliance only when the appliance is set to an active state.

28. The backup power system according to claim 22, further comprising a timing circuit operatively coupled to the current converter to provide electrical power to the appliance based on the time of day.

29. The backup power system according to claim 15, further comprising a voltage circuit operatively coupled to the DC to DC converter to control the voltage being supplied to the second electrical connector when the battery is electrically coupled to the second electrical connector, wherein the voltage circuit is adapted to reduce output voltage levels from the DC to DC converter based on output wattage to the appliance.

30. The backup power system according to claim 29, wherein the output wattage is measured at the second electrical connector.

31. The backup power system according to claim 22, further comprising a voltage circuit operatively coupled to the current converter to control the voltage being supplied to the second electrical connector when the rechargeable battery is electrically coupled to the second electrical connector, wherein the voltage circuit is adapted to reduce output voltage levels from the current converter based on output wattage to the appliance.

32. The backup power system according to claim 31, wherein the output wattage is measured at the second electrical connector.

33. The backup power system according to claim 15, wherein the switch-timing circuit is adapted to override the voltage circuit and provide full voltage output for a period of time regardless of the voltage level of the battery.

34. The backup power system according to claim 22, wherein the switch-timing circuit is adapted to override the voltage circuit and provide full voltage output for a period of time regardless of the voltage level of the rechargeable battery.

* * * * *